United States Patent [19]

De Jaeger et al.

[11] Patent Number: 4,544,536

[45] Date of Patent: * Oct. 1, 1985

[54] POLYCHLOROPHOSPHAZENES AND PROCESS FOR THEIR PREPARATION

[75] Inventors: Roger De Jaeger, Chereng; Moncef Helioui, Tunis; Emile Puskaric, Pont A Marcq, all of France

[73] Assignee: Institut Mondial du Phosphate, Casablanca, Morocco

[*] Notice: The portion of the term of this patent subsequent to Mar. 22, 2000 has been disclaimed.

[21] Appl. No.: 477,397

[22] Filed: Mar. 21, 1983

Related U.S. Application Data

[63] Continuation-in-part of Ser. No. 187,184, Sep. 15, 1980, Pat. No. 4,377,558.

[30] Foreign Application Priority Data

Sep. 27, 1979 [FR] France ................................ 79 24037

[51] Int. Cl.$^4$ ............................................. C01B 25/10
[52] U.S. Cl. .................................................... 423/300
[58] Field of Search ......................................... 423/300

[56] References Cited

U.S. PATENT DOCUMENTS 4,377,558  3/1983  De Jaeger et al. ................. 423/300

FOREIGN PATENT DOCUMENTS 26685  4/1981  European Pat. Off. .

OTHER PUBLICATIONS

Yakubovich, A. Ya., et al., "A New Method for Preparing Polyphosphazenes", *Russian Journal of Inorganic Chemistry*, vol. 8, No. 8, pp. 953–957, (1963).

*Primary Examiner*—John Doll
*Assistant Examiner*—Wayne A. Langel
*Attorney, Agent, or Firm*—Browdy and Neimark

[57] ABSTRACT

The present invention relates to novel polychlorophosphazenes and to the process for their preparation.

These polychlorophosphazenes of the general formula:

$$Cl_2(O)P[NPCl_2]_nCl$$

are prepared by the polycondensation of P trichloro-N dichlorophosphoryl-monophosphazene with the controlled release of $POCl_3$ according to the equation:

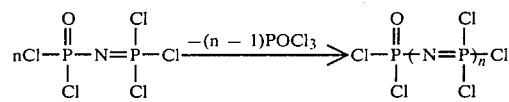

The novel polychlorophosphazenes so obtained are useful as antiflame materials, as coatings, as fertilizers, etc.

9 Claims, 6 Drawing Figures

POLYCHLOROPHOSPHAZENES AND PROCESS FOR THEIR PREPARATION

This is a continuation-in-part of application Ser. No. 187,184, filed on Sept. 15, 1980, now U.S. Pat. No. 4,377,558.

BACKGROUND OF THE INVENTION

1. Field of the Invention

The present invention relates to novel linear polychlorophosphazenes and to the process for their preparation.

2. Description of the Prior Art

Numerous publications describe the preparation of cyclic polychlorophosphazenes. Such preparation is relatively easy to accomplish, in view of the tendency of the lower compounds of the series of the chlorophosphazenes toward ring formation. It is noted however, that linear polychlorophosphazenes have a considerably greater economic interest than cyclic polychlorophosphazenes, on account of the range of their potential uses as materials having very extensive and very diverse applications like those of silicones, plastics materials and natural or synthetic elastomers, as antiflame and anticombustion materials or additives conferring antiflame and anticombustion properties on the materials and substances to which they are added, as coatings, in particular sealing coatings, in the biomedical field, as fertilizers, or as lubricants, in particular. Moreover, certain elastomers obtained by various substitutions on linear polychlorophosphazenes are found to have excellent behavior at low temperatures, as well as with respect to corrosive reactants. The major application of polychlorophosphazenes is represented by the fact that the latter constitute the optimum starting point for the production of polyorganophosphazenes, which are polymers having remarkable properties.

Some processes for the preparation of linear polychlorophosphazenes have been proposed in accordance with the prior art. Thus L. G. LUND, N. L. PADDOCK, F. E. PROCTOR and H. T. SEARLE (J. Chem. Soc. London, p. 2542, 1960), have described the production of polychlorophosphazenes according to the following reaction diagram:

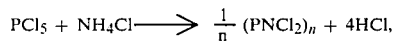

in symmetrical tetrachloroethane as solvent. However this route envolves a large number of reaction steps and constitutes a long and laborious process, since the crude product to which it gives rise is a mixture of cyclic compounds, present in the proportion of 90% and linear compounds of the PClhd 5 $(PNCl_2)_n$ type where n does not exceed 20, in a proportion of 10%.

To obtain longer linear polymers, the cyclic compounds are then treated with solvents to separate the trimer and tetramer from which there is extracted, by means of suitable solvents, the pure $(NP\ C_2)_3$ which is subjected to heat polymerization under reduced pressure at a temperature of 250° C. for two days, to give a linear $(PNCl_2)_n$ polymer with an optimum conversion ratio of 70% (H. R. ALLCOCK, R. L. KUGEL, K. J. VALAN Inorg. Chem. 1966, 5,1709).

On the other hand, BECKE-GOEHRING and LEHR (Z. Anorg. all. Chem. 1963, 325, p. 287), have prepared dichlorophosphorylpentachlorodiphosphazene $Cl_2(O)P+N=PCl_2+_2Cl$ by the reaction of $SO_2$ on the ionic compound $[Cl_3P=N-PCl_2=N-PCl_3]^+PCl_6^-$ obtained by the reaction of phosphorus pentachloride with ammonium chloride in a solvent with a low dielectric constant. It was not however possible for these authors to obtain higher homologs in which $n>2$, by reason of the formation of cyclic polychlorophosphazenes consequent upon the reaction of the ionic compound with the ammonium chloride. KIREJEW and Coll. (Z. obsc. Chem. URSS, 42 (104), 510, 1972) have, besides, described the preparation of dichlorophosphorylheptachlorotriphosphazene $Cl_2(O)P-N=PCl_2-_3\ Cl$ by cleavage of the ring of the hexachlorocyclotriphosphazene by means of $PCl_5$ and reaction of the scission product with $SO_2$. On the other hand, RIESEL and SOMIESKI (Z. anorg. allg. Chem. 411, p. 148-152, (1975)) proposed the synthesis of the first members of the series of the linear phosphorylchlorophosphazenes by step by step lengthening of the P—N—P chain by successively reacting $POCl_3$ or short chain phosphorylchlorophosphazenes, with hexamethyldisilazane and phosphorus pentachloride. However they did not succeed in going beyond the triphosphazene of the formula $Cl_2(O)P+N=PCl_2+_3Cl$ which, all the same, is an unstable compound which is decomposed by heating above 100° C., with the liberation of $POCl_3$ and the formation of $(PNCl_2)_n$ high polymers and of about 20% of hexachlorocyclotriphosphazene, the diphosphazene also having also a tendency, if it is overheated, to become condensed with the liberation of $POCl_3$ and formation of $(PNCl_2)_n$ high polymers.

It is also known from the URSS Pat. No. 176 416 in the names of V. S. Yakubovich, I. V. Lebedova, A. Ya. Yakubovich and N. I. Shvetsov, Karpov Scientific Research Physical-Chemical Institute, filed Mar. 25, 1963 and granted Nov. 22, 1965, that polychlorophosphazenes of the formula $Cl_2(O)P\ (NPCl_2)_nCl$ can be prepared from the following polymers : $PCl_5(NPCl_2)_{10}$ or $PCl_5(NPCl_2)_4$ by reaction with $SO_2$. The starting product is always a low polymer, and in no case the monomer. It is impossible to obtain the monomer by the process of this URSS patent, as this process teaches that the starting product is obtained from a mixture of cyclic and linear compounds which are the reaction product of $PCl_5$ and $NH_4Cl$.

It emerges from the Prior Art mentioned in the foregoing that the various direct routes proposed do not enable the production of linear polychlorophosphazenes, and only permit, at the best, the obtaining of linear dimers or trimers having highly limited potential industrial applications. The sole route at present adopted for the production of long chain linear polychlorophosphazenes, is the indirect route, described above, of the treatment of cyclic compounds. However, the large number of operations that it requires, of which the yield is rarely quantitative, and the utilization of large amounts of expensive solvents, make its cost prohibitive and weighs heavily on the cost of the polychlorophosphazenes obtained. In addition, this method only permits the obtaining of very long chain polychlorophosphazenes, on the order of approximately 15,000 $(NPCl_2)$ units, and it cannot be controlled to permit the production of polychlorophosphazenes whose chain length can be determined at will and notably of short or medium chain length linear polychlorophosphazenes, that is to say, including from 4 to 1 000 units or more, for example.

SUMMARY OF THE INVENTION

Consequently, it is an object of the present invention to provide a novel process for the preparation of polychlorophosphazenes which conforms better to the requirements of practice than the processes proposed by the Prior Art, notably in that it constitutes a simple, rapid and quantitative synthetic process which enables the cost price of the products obtained to be considerably lowered.

It is another object of the invention to enable the production of polychlorophosphazenes by a direct route, without resorting to transformation of cyclic polychlorophosphazenes.

It is a further object of the invention to enable the production of polymers in which it is possible to control at will the degree of polymerisation according to the applications envisioned.

DESCRIPTION OF THE PREFERRED EMBODIMENT

Figures 1, 2:
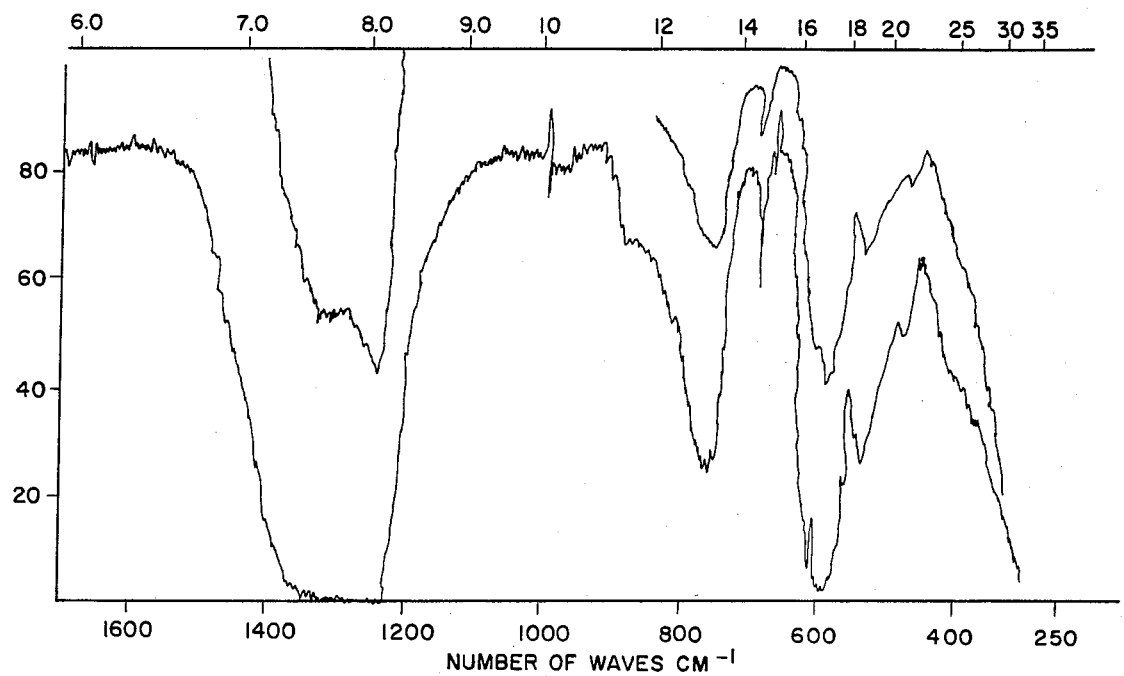

According to the present invention, there are provided novel linear polychlorophosphazenes which result from heating P-trichloro-N-dichlorophosphoryl-monophosphazene of formula II below:

at elevated temperatures with release of a controlled amount of POCl$_3$ to recover a polymer product having a molecular weight of at least about 617.5. More particularly the controlled amount of POCl$_3$ released during said heating represents on a molar basis at least about 50% of the amount of starting monophosphazene of formula II.

The linear polychlorophosphazenes according to the invention have molecular weight which are, as indicated above, of at least about 620 and can reach any desired higher value and can be as high as 120000 or greater (for instance up to about $5 \times 10^5$ or more). Without being quite sure what the reaction is, it is believed that the linear polychlorophosphazenes thus obtained correspond to the formula I below:

in which n is equal to or greater than 4, the value of n being controllable as desired to enable the production of chains of any desired average length, and in which n can be equal to or greater than 1,000 and for example can reach 5,000 or more.

The production of such polymers is surprising and unexpected, considering that the Prior Art only enabled the preparation of polymer of formula I in which n=2 or 3 and, besides, of polymers not including a terminal oxygen, in which n is of the order of 15,000, without being able to obtain intermediate polymers.

The advantage obtained by the possibility of controlling at will the value of n is represented by the fact that it is possible to confer certain desired physical properties on the polymers finally obtained, and to vary these properties over an extensive range.

The polycondensation by heating P trichloro-N-dichlorophosphoryl-monophosphazene of formula II which results in the novel long chain linear polychlorophosphazenes according to the invention is believed to proceed in accordance with the equation III below:

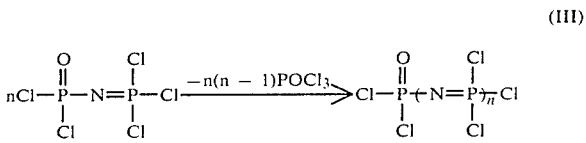

A process for the preparation of the novel long chain linear polychlorophosphazenes of formula I comprises the polycondensation by heating of P-trichloro-N-dichlorophosphoryl-monophosphazene of formula II in accordance with equation III, with controlled release of POCl$_3$, to obtain quantitatively a practically pure polychlorophosphazene of formula I, of controlled degree of condensation, wherein in equation III n is equal to or greater than 4.

The controlled polycondensation of the P-trichloro-N-dichlorophosphoryl-monophosphazene is conveniently carried out at atmospheric pressure or under reduced pressure, that is to say under pressures which can range from 0.1 mm Hg to atmospheric pressure although pressures higher than atmospheric pressure and equal for instance to about ten bars or more could be used. When operating under reduced pressure a suitable reduced pressure range is between 0.1 and 250 mm Hg and preferably between 0.5 and 150 mm Hg.

In the course of the polycondensation reaction the pressure can be varied and it is possible to conduct the polycondensation reaction in part at atmospheric pressure and in part under reduced pressure. This can be done for instance by starting the polycondensation at atmospheric pressure and terminating at reduced pressure. A convenient reduced pressure range for this purpose is between 0.1 and 250 mm Hg and more particularly between 0.5 and 150 mm Hg.

When the polycondensation reaction is started at atmospheric pressure and is terminated at reduced pressure it is preferred that the time during which the polycondensation proceeds at atmospheric pressure represents about 70 to 90% of the total duration of the reaction and that the time for which the reduced pressure is applied amounts about 30 to 10% of the total duration of the reaction.

The temperatures at which the controlled polycondensation reaction of the P-trichloro-N-dichlorophosphoryl-monophosphazene is performed may vary depending upon the pressures used. When operating at about atmospheric pressure temperatures of at least 180° C. are suitable. When operating under reduced pressure the polycondensation may start at temperatures as low as about 100° C. if the reduced pressure is sufficiently low, for instance of about 1 to 10 mm Hg. However temperatures of at least 150° C. should practically be used for obtaining a significant polycondensation rate. When performing the polycondensation reaction under reduced pressure in the range from about 0.1 mm Hg to 250 mm Hg and particularly from 0.5 mm Hg to 150 mm Hg, temperatures of at least 150° C. and particularly from 170° C. to 350° C. have been found suitable whereas temperatures of at least 180° C. and particularly from 190° C. to 350° C. are convenient when operating at about atmospheric pressure. Temperatures of at least 180° C, particularly from 190° C. to 350° C. and especially from 200° C. to 300° C. can be selected for performing the polycondensation reaction whatever the pressure in the range of from 0.1 mm Hg to about atmospheric pressure.

The time required for the polycondensation reaction to proceed to the desired degree depends among others upon the temperatures which the polycondensation is performed, higher temperatures requiring shorter times. Polycondensation times between about 5 hours and about 30 hours are normally very suitable for obtaining the desired result.

According to an embodiment of the invention the polycondensation of the P-trichloro-N-dichlorophosphoryl-monophosphazene is carried out at least in part at a temperature equal to or higher than 240° C. and preferably not greater than 300° C. In this latter case the controlled polycondensation reaction is preferably started by heating at a temperature from 260° C. to 300° C. for a suitable period of about 10 to 25% of the total duration of the reaction, then the heating temperature is gradually lowered to 240° C. at which temperature it is continued until the end of the reaction.

The controlled polycondensation reaction of the P-trichloro-N-dichlorophosphoryl-monophosphazene can be conducted, at least partly, under a stream of inert gas, such as anhydrous nitrogen in particular, which facilitates the evolution of the $POCl_3$ and reduces, through this fact, the duration of the reaction.

Further it is preferable to carry out the controlled polycondensation reaction with stirring.

The controlled polycondensation reaction can be continued until the practically complete removal of the theoretical $POCl_3$ without branching reactions occurring.

The degree of condensation obtained is a function of various parameters, and notably of the temperatures applied, of the duration of heating, of the volume treated, of the pressure utilized, of the reaction conditions, such as stirring, the atmosphere in which the reaction takes place, etc. . . , which parameters can be programmed to obtain the optimum desired result.

According to another advantageous variation in the process according to the invention, the product of the polycondensation reaction is purified by treating it with a solvent for cyclic phosphazenes and at the same time a solvent for short chain linear polychlorophosphazenes (where n is less than 4 or 5), such as petroleum ether, for example.

The process according to the invention enables the obtaining of linear polychlorophosphazenes of formula I, having a very low percentage of impurities, always less than 5%, which are removed by the above purification treatment. These impurities are constituted by cyclic polychlorophosphazenes and short chain linear polyphosphazenes; the 95% of products which precipitate in the course of this purification treatment has been identified as being high polymers of chlorophosphazene, of formula I, by the following methods:

The IR spectrum of the polychlorophosphazenes obtained according to the invention, and which is represented in FIG. 1, shows:

an intense and wide absorption band in the 1300 $cm^{-1}$ region characteristic of the elongation of the P=N bound, (resolved in the case of thin films into two components at 1310 and 1240 $cm^{-1}$);

two absorptions of average intensity at 755 and 470 $cm^{-1}$ characteristic respectively of the deformation of the N—P—N and P—N—P bridges;

two absorptions of strong intensity at 585 $cm^{-1}$ and average intensity at 535 $cm^{-1}$ relating to the elongations of the P—Cl bond.

(These observations were made by comparison with the studies of MANLEY and WILLIAMS (Polymer, 1969, 10,307), relating to the high polymer $(NPCl_2)_n$);

a narrow band at about 680 $cm^{-1}$ corresponding to residual benzene (the benzene being the solvent for the linear polychlorophosphazenes).

The NMR spectrum of phosphorous 31 shown the accompanying FIG. 2, exhibits a peak at +18.8 $ppm/H_3PO_4$ 85% in accordance with the results of ALLCOCK and Coll. (Inorg. Chem. 1965, 5, 1709).

The UV spectrum confirms by its absorption in the 370 nm region, the formation of linear phosphazenes.

Thin layer chromatography of the crude reaction product, done according to the indications of NOVOBILSKY and Coll. (Z. Anorg. Allg. Chem. 1975, 416, 187 and 1976, 423, 273) establishes the near nonexistence of cyclic phosphazenes.

Measurements of the glass transition temperature, carried out by differential enthalpic analysis on polymers of different lengths are always located in the vicinity of −60° C., the number of elementary units seeming only to have a very slight influence on the latter.

Apart from the foregoing features, the invention comprises yet other features which will emerge from the description which follows.

The invention relates more particularly to the linear polychlorophospazenes according to the invention, the processes of preparation of these polymers according to the foregoing features, as well as to the means applied for the preparation of these linear polymers, the overall processes in which said processes are included and the products produced by means of the long chain linear polychlorophosphazenes according to the invention.

DESCRIPTION OF PREFERRED EMBODIMENTS

The invention will be better understood by means of the additional description which follows, with reference to the examples of carrying-out of the process according to the invention.

It must however be understood, of course, that these examples of the application of the invention are given purely by way of illustration and are not to be considered as constituting a limitation of the scope of the invention in any way.

EXAMPLE I

1. Preparation of P trichloro-N-dichlorophosphoryl-monophosphazene

The P trichloro-N-dichlorophosphoryl-monophosphazene of formula II above is easily obtained by applying the method developed by EMSLEY and UDY J. Chem. Soc. (A) 1971, 2863 who react $PCl_5$ with $(NH_4)_2SO_4$ in symmetrical tetrachlorethane or chlorobenzene at their boiling point, by the following procedure:

A. $P_2NOCl_5$ is prepared in symmetrical tetrachlorethane, from 25.43 g of $PCl_5$ and 3.59 g of $(NH_4)_2SO_4$, in 55 ml of sym. $C_2H_2Cl_4$. The reaction lasts an hour at 146° C. and permits the production of 14.55 g of $P_2NOCl_5$.

B. As an alternative, the $P_2NOCl_5$ is prepared in chlorobenzene at 132° C. from 28.82 g of $PCl_5$ and 4.07 g of $(NH_4)_2SO_4$, in 62 ml of $C_6H_5Cl$. The reaction lasts 2 hours at the end of which 14.55 g of pure crystalline $P_2NOCl_5$ is collected.

Preparation of a $Cl_2(O)P(NPCl_2)_nCl$ polymer 14.55 g of $P_2NOCl_5$ obtained as described at 1. above, were heated at 240° C. for 8 hours, at atmospheric pressure. In this way a polymer $Cl_2(O)P(NPCl_2)_nCl$ of average molecular weight equal to 3500 (determined by vapor pressure osmometry) was obtained, which corresponds to $n \simeq 29$.

There was a release of $POCl_3$ in the course of the reaction and if the loss of $POCl_3$ corresponding to a polymer of molecular weight 3500 is calculated, 8.0 g is found.

Figure 3:
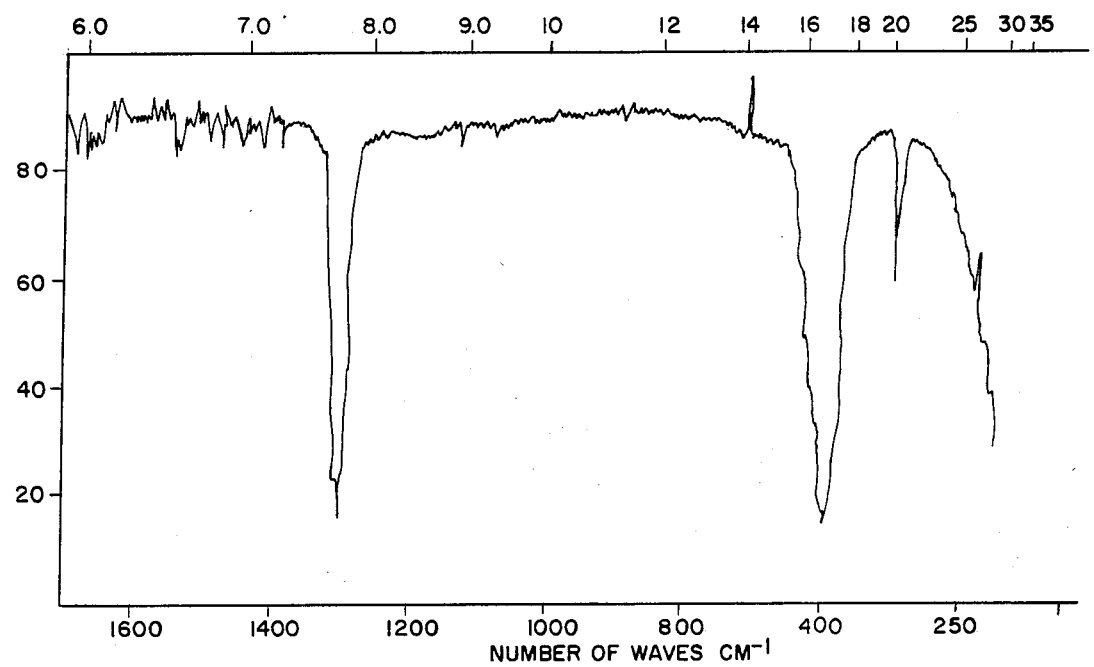

It should be noted that the process according to the invention enables the quantitative recovery of the phosphorus of the $P_2NOCl_5$ partly in polymer form, and partly in the form of spectroscopically pure $POCl_3$ (as emerges from accompanying FIG. 3).

EXAMPLE II 20.82 g of $P_2NOCl_5$ (obtained as described in Example I 1. above) was heated for 8h.30m, at a temperature of 280° C., maintaining moderate stirring throughout the duration of heating.

Figure 4:
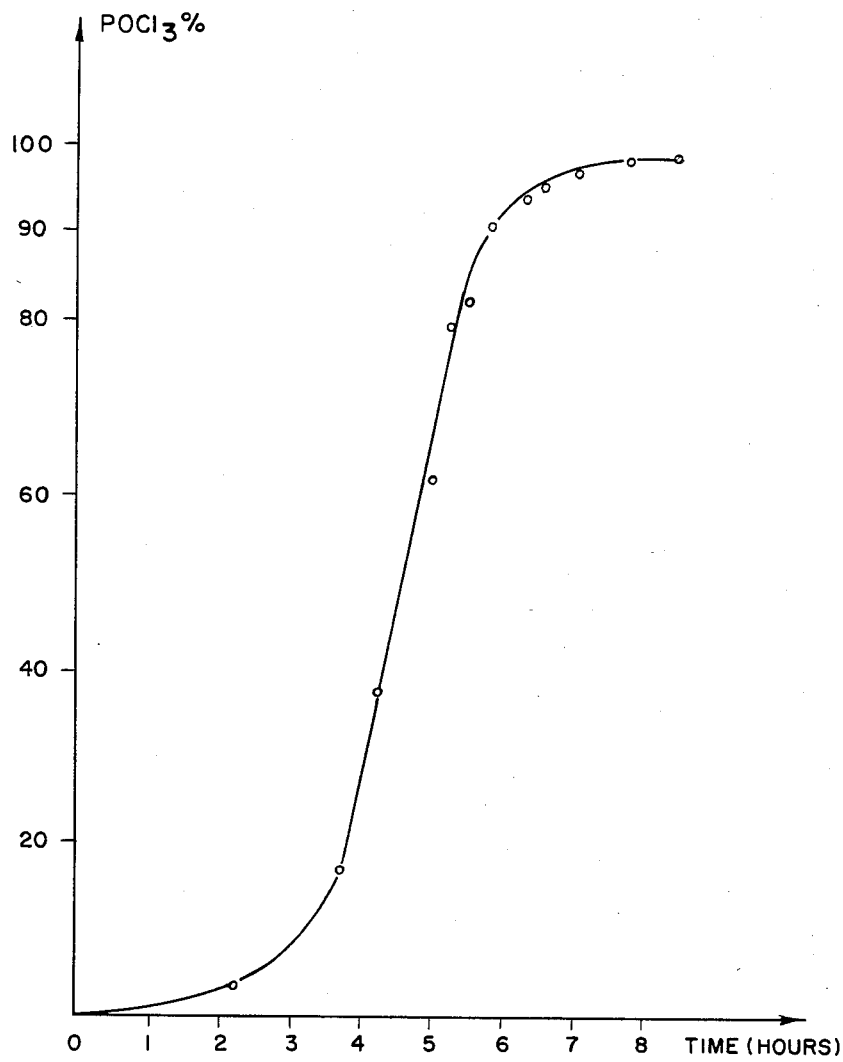

The volume percent graph of $POCl_3$ collected as a function of time (100% corresponding to complete removal) was established: of FIG. 4).

The total weight of $POCl_3$ collected was 160 g reduced to 1 mole of starting $P_2NOCl_5$. The deviation with respect to 153.5 g (weight of 1 mole of $POCl_3$ corresponding to the production of $(NPCl_2)_n$) is due to the distillation of some $P_2NOCl_5$. This proves that when the experiment is pursued to its limit, the measurement of the volume of $POCl_3$ does not suffice to determine the number of units. The crude product obtained, quite colorless, was completely soluble in benzene, which proves the absence of branched polychlorophosphazenes.

The results of analysis of the product are as follows: theoretical for $(NPCl_2)_n$:Cl, 61.21%; N, 12.07%; P, 26.72%; found: Cl, 61.52%; N, 11.90%; P, 26.81%.

This product was treated with petroleum ether at 40°-60° C. which is a precipitating agent for the $(NPCl_2)_n$ high polymer and a solvent for cyclic phosphazenes as well as phosphazenes of the type $Cl_2(O)P(NPCl_2)_nCl$ where n is small. In this way a fraction representing 5% by weight of the treated product was solubilized.

Figure 5:
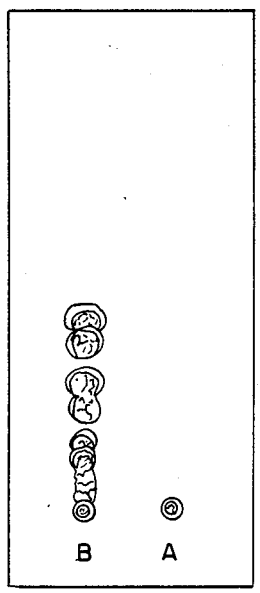
Figure 6:
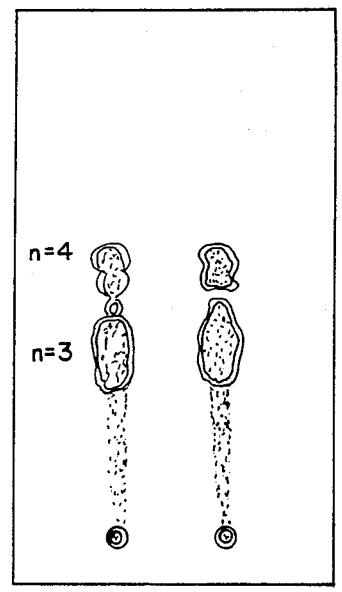

A chromatographic check (thin layer chromatography on a silica plate -Eluent: hexane) of the insoluble fraction proves the absence of residual $P_2NOCl_5$, as well as of cyclic phosphazenes (cf. chromatographic plate in FIG. 5—spot A—which is to be compared with the chromatographic plate shown in FIG. 6 which shows the spots representing cyclic polychlorophosphazenes). Determination of the average molecular weight carried out by means of a Knauer vapor pressure osmometer, shows that the latter is higher than 20,000.

As regards the soluble phase, a chromatographic check (see the plate shown in FIG. 5—spot B) shows the existence of a series of compounds of very close Rf: these can only be cyclic or linear phosphazenes of the type $Cl_2(O)P$- $(NPCl_2)_nCl$.

The I.R. spectrum of this phase, as well as the NMR $P^{31}$ spectrum of the crude product (which permits the conclusion of the absence of $(NPCl_2)_3$ and $(NPCl_3)_4$) favor the second hypothesis.

The NMR $P^{31}$ spectrum of this soluble phase permits affirmation that the amount of cyclic phosphazenes $(NPCl_2)_n$ with $3 \leq n \leq 6$ in the crude product is practically negligable. It has been verified that the average molecular weight of the polymer obtained is of the order of 28,000 to 29,000, the average n being of the order of 240 to 245.

EXAMPLE III 200 g of $P_2NOCl_5$ (obtained as described in Example I.1 above) was heated under a nitrogen atmosphere at a temperature of 180° C. and under a reduced pressure of 100 mmHg, while maintaining a moderate stirring throughout the duration of heating.

There was a release of $POCl_3$ in the course of the reaction and after a heating period of 12 hours the amount of $POCl_3$ collected was 114 g, this corresponding to the theoretical amount of $POCl_3$ that could evolve from the starting amount of $P_2NOCl_5$. After this period heating was continued for six additional hours using the same operating conditions.

The crude product obtained (85 g), was completely soluble in benzene, which proves the absence of branched polychlorophosphazenes. Further said product was treated with petroleum ether at 40°-60° C. which is a precipitating agent for the $(NPCl_2)_n$ high polymer and a solvent for cyclic phosphazenes as well as linear phosphazenes of the type $Cl_2(O)P(NPCl_2)_n Cl$ where n is small (2 or 3). In this way a fraction representing about 3% by weight of the treated product was solubilized.

The purified polymer separated as a precipitate from the petroleum ether fraction was then dissolved in anhydrous benzene and treated by sodium trifluoroethoxide to replace the chlorine atoms of the polymer by trifluoroethoxide radicals which are less reactive, this treatment being carried out in a way similar to that disclosed by H. R. ALLCOCK et al (Inorg. Chem. 1966, 5, 1714) for treating polydichlorophosphazene.

The trifluoroethoxylated polymer obtained had a weight average molecular weight ($\overline{M}w$) of 170,000 and a polydispersity equal to 1.60, this corresponding to a weight average molecular weight of the polymer resulting from the polycondensation of $P_2NOCl_5$ equal to about 81,000 and an average value for n of about 430.

EXAMPLE IV 200 g of $P_2NOCl_5$ (obtained as described in Example I.1 above) was heated at a temperature of 210° C. at atmospheric pressure, while maintaining a moderate stirring throughout the duration of heating.

$POCl_3$ was released in the course of the reaction and after a heating period of 14 hours the theoretical amount of $POCl_3$ that could evolve from the starting amount of $P_2NOCl_5$ was collected. Thereafter heating was continued for six additional hours.

The crude polymer obtained (85 g) was completely soluble in benzene, this proving the absence of branched polychlorophosphazenes. Further when treating the crude polymer with petroleum ether at 40°-60° C. a fraction representing about 2% by weight of the treated product was solubilized.

The polymer purified by treatment with petroleum ether was then dissolved in anhydrous benzene and treated by sodium trifluoroethoxide as indicated in example III.

The trifluoroethoxylated polymer obtained had a weight average molecular weight ($\overline{M}w$) of 358,000 and a polydispersity equal to 1.66, this corresponding to a weight average molecular weight of the polymer resulting from the polycondensation of $P_2NOCl_5$ equal to about 170,000 and an average value for n in the formula I defining the polymer equal to about 885.

EXAMPLE V 228 g (0.84 mole) of $P_2NOCl_5$ (obtained as described in Example I.1 above) was heated at 290° C. for 27 hours, at atmospheric pressure while maintaining moderate stirring throughout the duration of heating.

There was a release of $POCl_3$ in the course of the reaction and at the end of the heating period the volume of condensed vapors collected was 78 cm$^3$. The deviation with respect to the theoretical volume (77,5 cm$^3$) of $POCl_3$ that could evolve from the starting amount of $P_2NOCl_5$ is due to the distillation of some $P_2NOCl_5$.

The crude product obtained was treated with n-heptane which is a precipitating agent for the linear $(NPCl_2)_n$ high polymer and a solvent for cyclic phosphazenes as well as linear oligomeric phosphazenes of the type $Cl_2(O)P—NPCl_2)_n Cl$ where n is small (2 or 3) and 84 g (0.72 mole) of high polymer were recovered, this corresponding to a conversion yield representing about 85% of the theoretical conversion yield (conversion of $P_2NOCl_5$ into linear $(NPCl_2)_n$ by releasing all the $POCl_3$ available).

The purified polymer resulting from the treatment with n-heptane was then dissolved in anhydrous benzene and treated by sodium trifluoroethoxide as indicated in example III.

The trifluoroethoxylated polymer thus obtained had a weight average molecular weight ($\overline{Mw}$) of 645,760 and a number average molecular weight ($\overline{Mn}$) equal to 435,590 determined by gel permeation chromatography. The corresponding values of $\overline{Mw}$ and $\overline{Mn}$ for the polymer resulting from the polycondensation of $P_2NOCl_5$ were respectively equal to 308,000 and 207,780 whereas the average value for n in the general formula $Cl_2(O)P(NPCl_2)_nCl$ was equal to about 1790.

It results from the foregoing description that there are obtained, according to the present invention, long chain linear polychlorophosphazenes which show numerous possibilities of industrial application both in themselves, as indicated above, and as starting materials for the preparation of polyorganophosphazenes by means of substitution reactions of the following types:

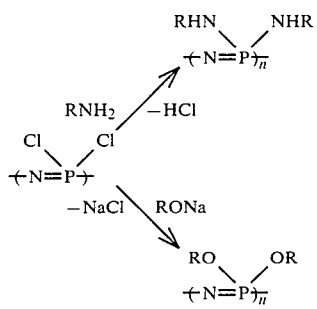

which have permitted the production of the following polymers: [NP (OHe)$_2$]$_n$; [NP(OCH$_2$CF$_3$)$_2$]$_n$; [NP(OCH$_2$C$_3$F$_7$)$_2$]n; [NP (OCH$_2$CF$_3$) (OCH$_2$C$_3$F$_7$)]$_n$; [NP (OCH$_2$C$_3$F$_7$)$_2$]$_n$ etc . . . , whose properties are remarkable, particularly for [NP (OCH$_2$CF$_3$) (OCH$_2$C$_3$F$_7$)]$_n$ which is an amorphous elastomer resistant to hydrolysis, to heat, as well as to the majority of solvents and chemical products, and which are possibly flexible and are useful in industry as elastomers, thermoplastic materials, films and glass substitutes. The invention procures, in addition, the advantage of providing a process for the production of long chain linear polychlorophosphazenes relatively inexpensively since its cost is ten times less that of the process for treating cyclic chlorophosphazenes used at present on the industrial scale. The process according to the invention has, in addition, the advantage of constituting a simple, rapid and quantitative method of polymerization.

As emerges from the foregoing, the invention is in no way limited to those of its applications, embodiments and uses which have just been explicitly described; it encompasses, on the contrary, all modifications which may occur to the technician skilled in the art, without departing from the frame-work nor the scope, of the present invention.

We claim:

1. Linear polychlorophosphazenes resulting from heating P-trichloro-N-dichlorophosphoryl-monophosphazene of formula II

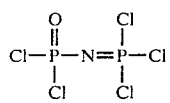         II with release of a controlled amount of POCl$^3$ to recover a practically pure linear polychlorophosphazene of the general formula:

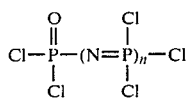

wherein n is equal to or greater than 4.

2. Process for the preparation of the novel linear polychlorophosphazenes of formula I $$Cl_2(O)P\;[NPCl_2]_nCl \qquad\qquad I$$

said process comprising the polycondensation by heating of P-trichloro-n-dichlorophosphoryl-monophosphazene of the following formula II:

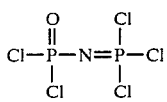         II in accordance with the following equation III:

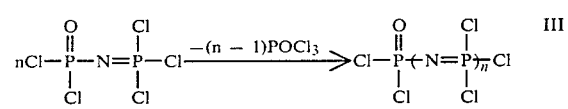

with a controlled release of POCl$_3$, to obtain quantitatively a practically pure polychlorophosphazene of formula I, of controlled degree of condensation, wherein n≧4, said polycondensation by heating being carried out at a temperature equal to or higher than 180° C.

3. A process according to claim 2, wherein the controlled polycondensation is carried out at least in part in an inert gas atmosphere.

4. Process for the preparation of the novel linear polychlorophosphazenes of formula I:

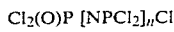

said process comprising the polycondensation by heating of P trichloro-N-dichlorophosphoryl-monophosphazene of the following formula II:

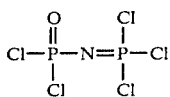

in accordance with the following equation III:

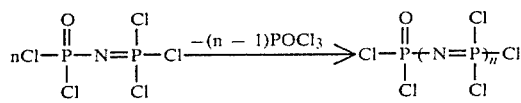

with controlled release of $POCl_3$, to obtain quantitatively a practically pure polychlorophosphazene of formula I, of controlled degree of condensation, wherein $n \geq 4$, said polycondensation by heating being carried out at temperatures of at least 150° C. under reduced pressure in the range of from about 0.1 to 250 mmHg throughout the entire process.

5. A process according to claim 4, wherein said polycondensation is performed under reduced pressure in the range of from about 0.5 mmHg to about 150 mmHg.

6. Process for the preparation of the novel linear polychlorophosphazenes of formula I:

said process comprising the polycondensation by heating of P trichloro-N-dichlorophosphoryl-monophosphazene of the following formula II:

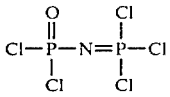

in accordance with the following equation III:

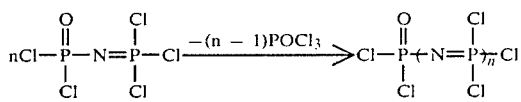

with controlled release of $POCl_3$, to obtain quantitatively a practically pure polychlorophosphazene of formula I, of controlled degree of condensation, wherein $n \geq 4$, said polycondensation by heating being carried out at temperatures ranging from 170° C. to 350° C. under reduced pressure in the range of from about 0.1 to 250 mmHg throughout the entire process.

7. A process according to claim 6, wherein said polycondensation is performed under reduced pressure in the range of from about 0.5 mmHg to about 150 mmHg.

8. Process for the preparation of the novel linear polychlorophosphazenes of formula I:

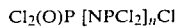

said process comprising the polycondensation by heating of P trichloro-N-dichlorophosphoryl-monophosphazene of the following formula II:

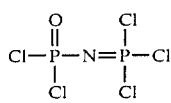

in accordance with the following equation III:

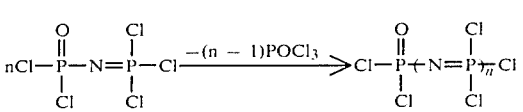

with controlled release of $POCl_3$, to obtain quantitatively a practically pure polychlorophosphazene of formula I, of controlled degree of condensation, wherein $n \geq 4$, said polycondensation by heating being carried out at temperatures of at least 100° C. under reduced pressure throughout the entire process.

9. Process for the preparation of linear polychlorophosphazenes of the formula $Cl_2(O)P(NPCl_2)_n$ Cl, said process comprising polycondensation by heating of P trichloro-N-dichlorophosphorymonophosphazene of the formula II:

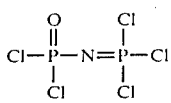

in accordance with the following equation III:

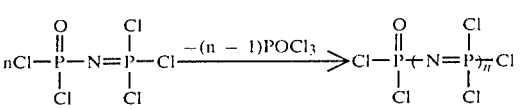

with controlled release of $POCl_3$, to obtain quantitatively a practically pure polychlorophosphazene, of controlled degree of condensation, wherein n is greater than or equal to 4, said polycondensation by heating being carried out at temperatures ranging from about 180° C. to about 210° C. in the pressure range of from about 100 mmHg to about atmospheric pressure.

* * * * *